July 10, 1962
W. F. OTT ETAL
3,043,572
SEPARATE THERMOSTAT CONTROLLED LATCH
MECHANISM FOR SECONDARY THROTTLES
Filed July 13, 1959
6 Sheets-Sheet 1
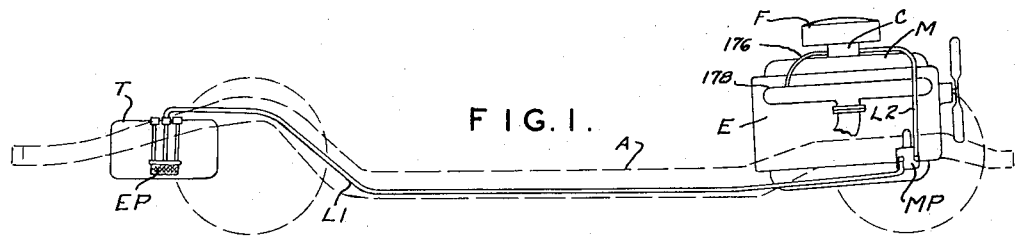
FIG. 1.
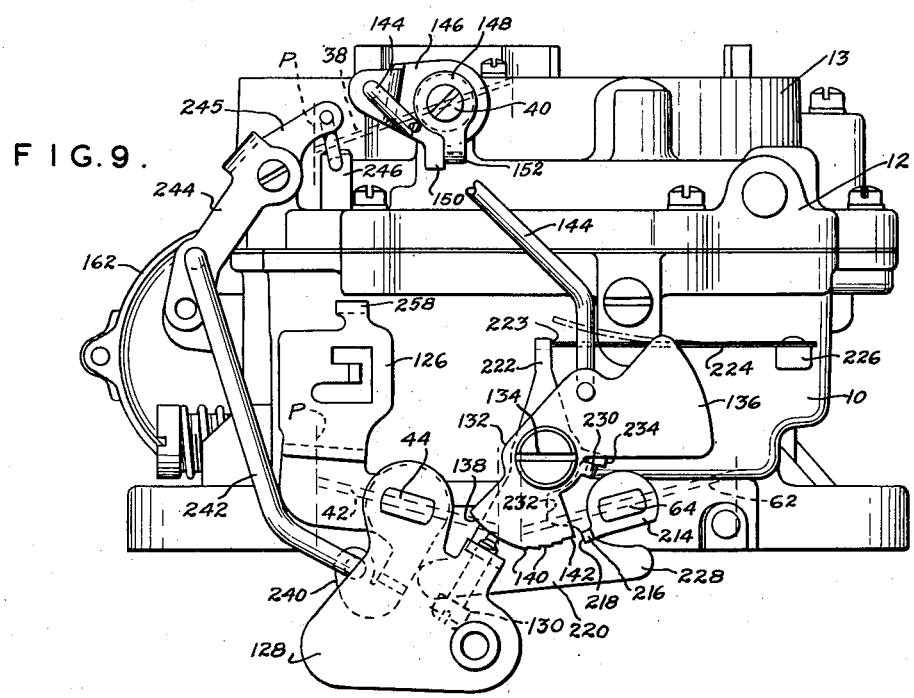
FIG. 9.
FIG. 11.
INVENTORS
WILLIAM F. OTT
JOHN H. KREIN
HAROLD A. CARLSON
BY
AGENT

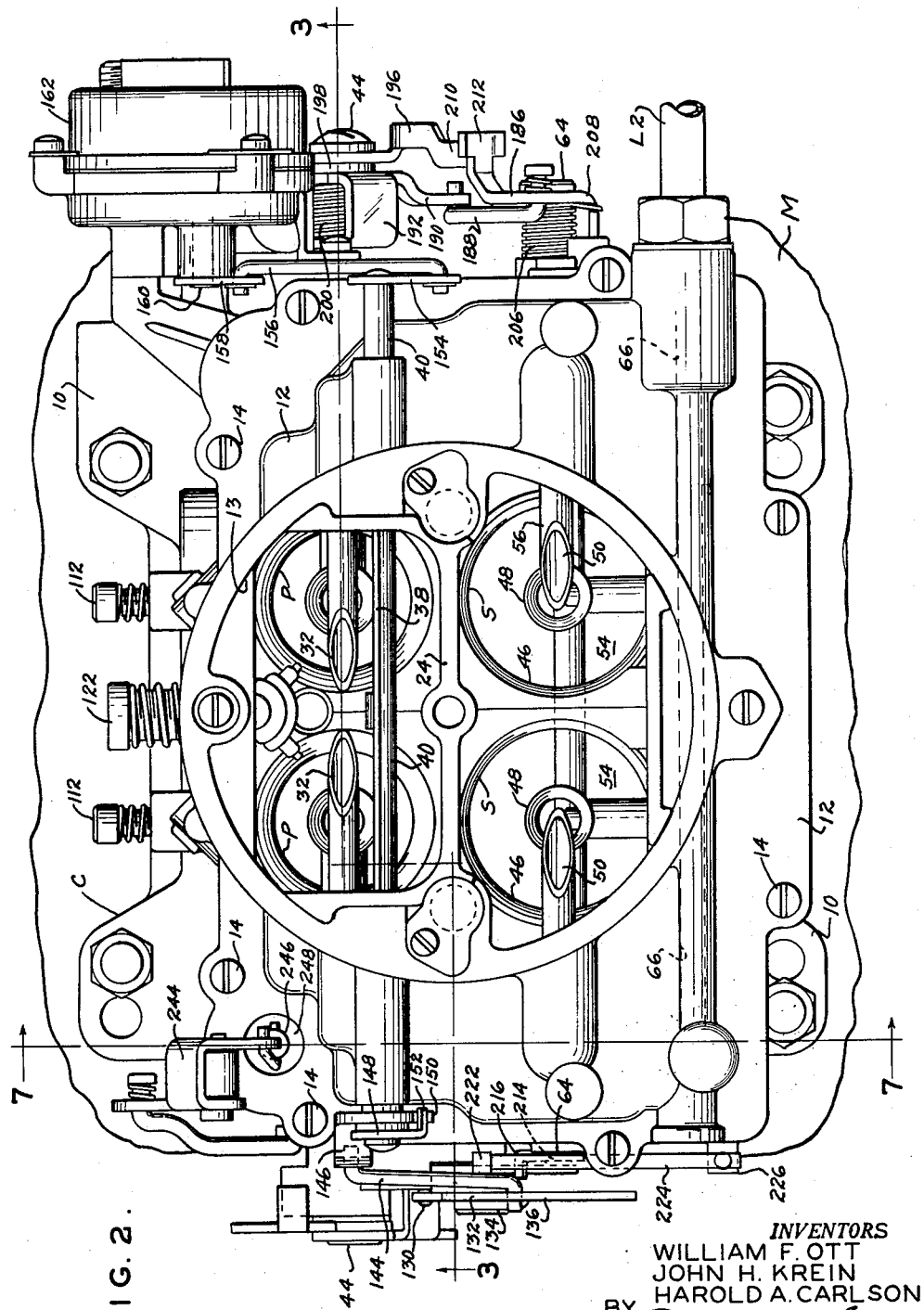

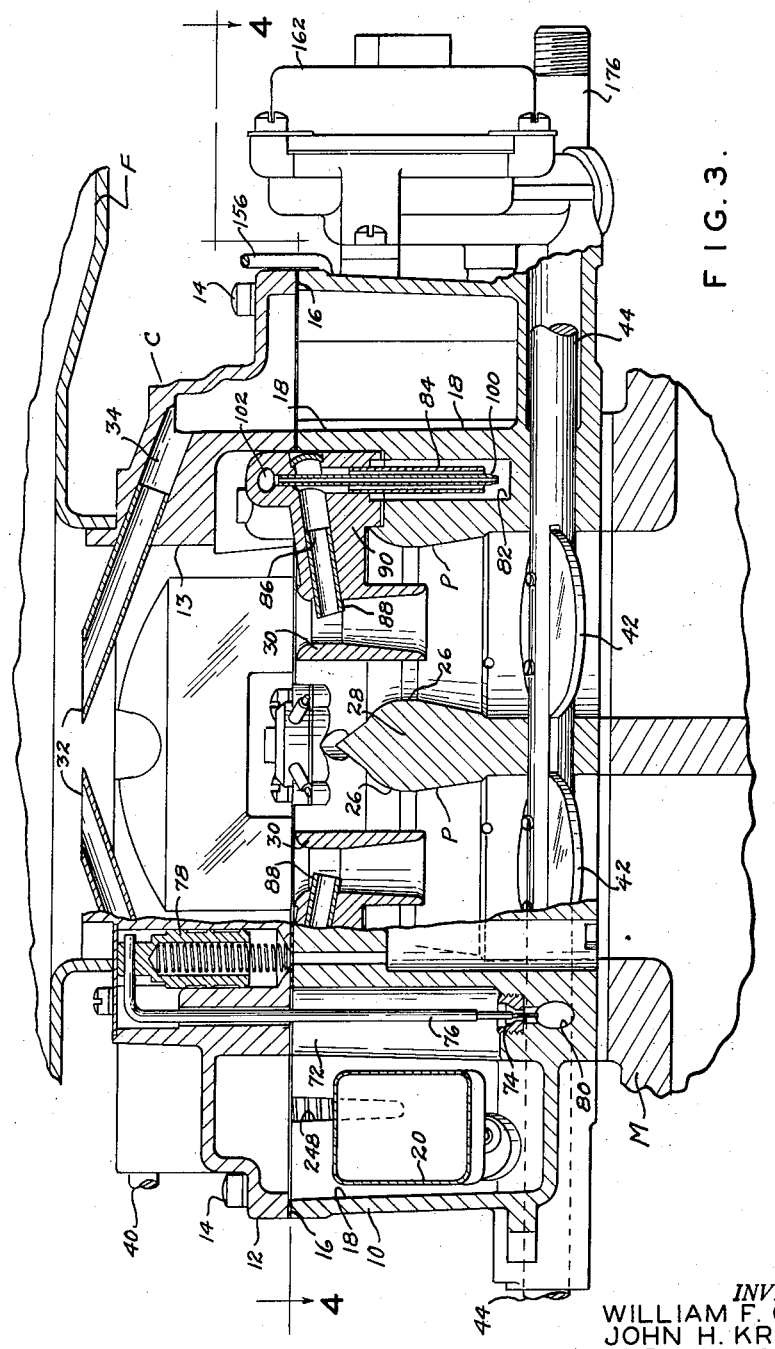

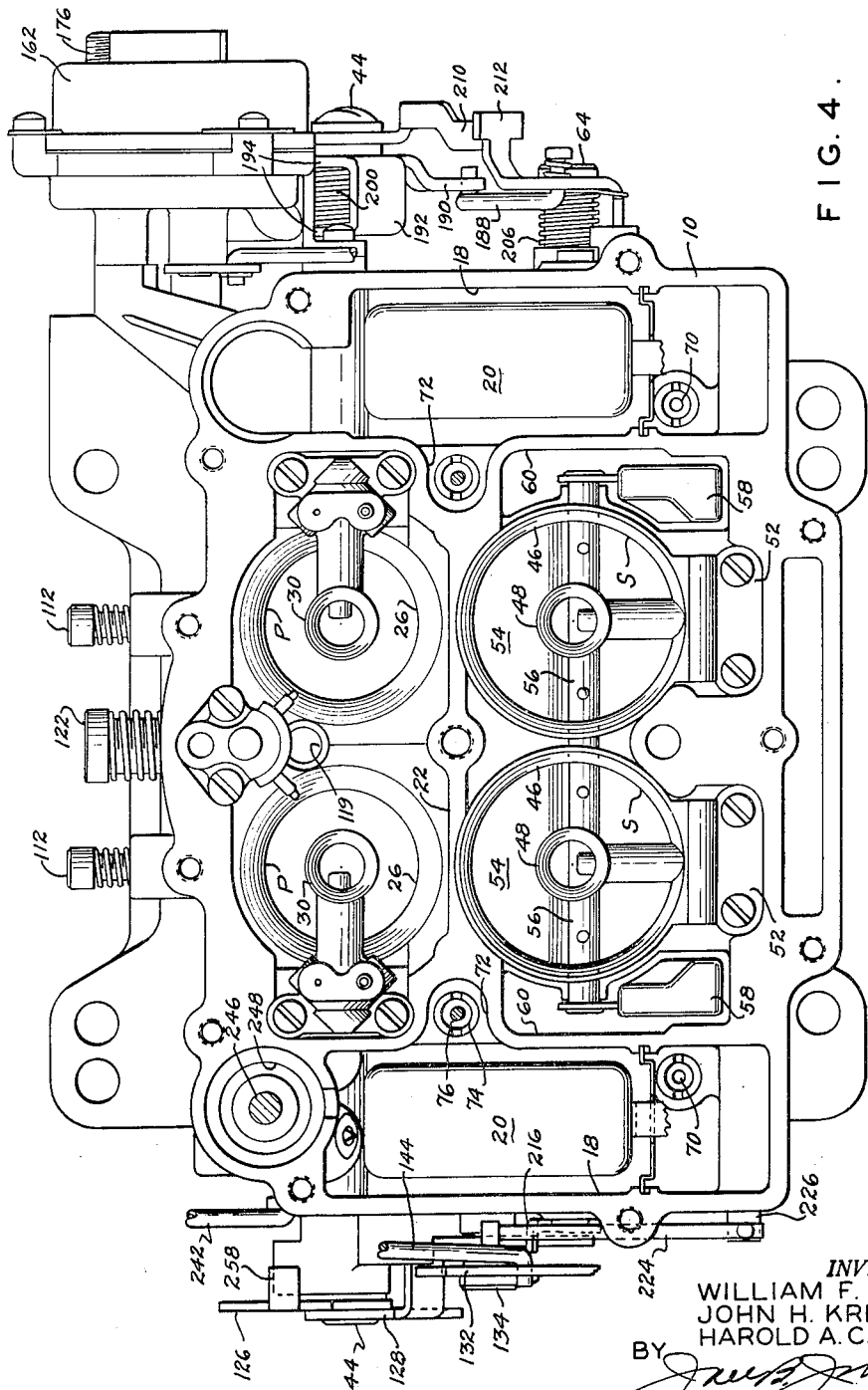

*INVENTORS*
WILLIAM F. OTT
JOHN H. KREIN
HAROLD A. CARLSON
BY

AGENT

United States Patent Office 3,043,572
Patented July 10, 1962

3,043,572
SEPARATE THERMOSTAT CONTROLLED LATCH MECHANISM FOR SECONDARY THROTTLES
William F. Ott, Affton, John H. Krein, Florissant, and Harold A. Carlson, Brentwood, Mo., assignors to ACF Industries, Incorporated, New York, N.Y., a corporation of New Jersey
Filed July 13, 1959, Ser. No. 826,574
11 Claims. (Cl. 261—23)

This invention relates to carburetors for internal combustion engines, especially of the automotive type, and more particularly to lockout means for the secondary stage of a multi-stage carburetor such as a four-barrel carburetor.

The invention is particularly concerned with multi-stage carburetors, such as a four-barrel carburetor, having a primary stage comprising two primary mixture conduits or barrels and a secondary stage comprising two secondary mixture conduits or barrels, with primary throttles in the primary barrels, secondary throttles in the secondary barrels, and a choke valve controlling the flow of air through the primary barrels. The secondary throttles provide an additional flow of a fuel and air mixture to the cylinders when fast acceleration is required or at high speed when the primary throttles are in a wide open range of operation.

Certain carburetors of this class are provided with a fast idle cam controlled by the choke valve of the carburetor for controlling the position of the primary throttle valves at idle. The fast idle cam is formed so that initially in its starting or fast idle position with the engine cold and the choke valve closed, it blocks the primary throttle valves partly open.

The position of the fast idle cam is controlled, for example, by a connection to the choke shaft, so that as the choke valve opens, the fast idle cam operates in phase with the choke valve, moving from its starting or fast idle position to its normal idle position (hot engine idle position) and reaching the latter at the same time that the choke valve reaches its full open position. It will be understood that the choke valve acts as a restriction to flow of air through the primary barrels to provide an enriched air-fuel mixture during the cranking of the engine for starting purposes, opening and closing with each intake stroke of the engine.

After the engine has started, and during the warm-up of the engine, the choke valve assumes a partly open position, in which it continues to act as a restriction to some extent to provide a degree of mixture enrichment for smooth operation of the engine. As the engine warms up and the choke valve opens, the fast idle cam blocks the primary throttle valves open to a progressively lesser degree to provide the optimum idle speed. When the engine has fully warmed up and the choke valve reaches full open position, the fast idle cam may assume a full off or inactive position, to permit the primary throttle valves fully to close or to close to a preset position.

Certain carburetors of the class described also include a lockout for the secondary throttle valves to lock the secondary throttle valves in closed position until the engine has fully warmed up. This lockout has been controlled by the fast idle cam, and is released by the latter when the fast idle cam reaches its normal idle position, i.e., when the engine has fully warmed up. However, under conditions (as in cold weather) when the temperature under the hood of the vehicle is low, and consequently the temperature of the air flowing to the carburetor is low, we have found it desirable to maintain the secondary throttle valves locked in a closed position even though the engine may be fully warmed up and the choke valve may be fully opened, until the temperature under the hood is increased by heat from the engine.

Accordingly, an object of this invention is the provision of a secondary throttle lockout which is responsive to more than one temperature variable.

In general, this object is attained by providing a separate thermostatic latch for the secondary lockout adapted to maintain the secondary lockout in locking position at underhood temperatures below a predetermined value, and adapted to release the secondary lockout when the underhood temperature is above the stated predetermined value. Thus, this latch, acting through the secondary lockout, is adapted to maintain the secondary throttles in closed position at low underhood temperatures even though the engine should be fully warmed up and the choke should be fully open. If the underhood temperature is initially sufficiently high, the separate thermostatic latch occupies a retracted position, allowing the secondary lockout to be actuated by the fast idle cam when the choke reaches its full open position.

It has also been found desirable, under certain circumstances, to maintain the primary throttles blocked open at idle to provide the correct idle speed, even though the choke valve may be open, until the temperature under the hood is increased by heat from the engine.

Accordingly, it is a further object of this invention to provide a thermostatic latch for the secondary lockout which, in addition to holding the secondary lockout in locking position until the underhood temperature has increased to the stated predetermined value, acts to maintain the primary throttles blocked open at idle at least to some extent thereby tending to provide the correct idle speed until the underhood temperatures is increased by heat from the engine.

In general, this second object is attained in an arrangement wherein the thermostatic latch for the secondary lockout, when in latching position, acts to limit the movement of the fast idle cam, arresting the movement of the latter before it reaches its normal idle position, but releases the fast idle cam to allow it to complete its movement to normal idle position when underhood temperature increases to the stated predetermined value.

Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a schematic view illustrating a carburetor of this invention mounted on the engine of an automotive vehicle;

FIG. 2 is a plan view of a carburetor incorporating the invention;

FIG. 3 is an elevational sectional view of the carburetor of FIGURE 2 along the sectional line 3—3 of FIGURE 2;

FIG. 4 is a sectional view of the carburetor of FIGURE 2 along the sectional line 4—4 of FIGURE 3;

FIGS. 9 and 10 are respectively side elevational views of the opposite sides of the carburetor of FIGURES 2 through 4;

FIG. 11 is an isometric view of the lock-out mechanism of FIGURE 9;

Corresponding reference characters indicate corresponding parts throughout the several views of the drawings.

Figure 7:
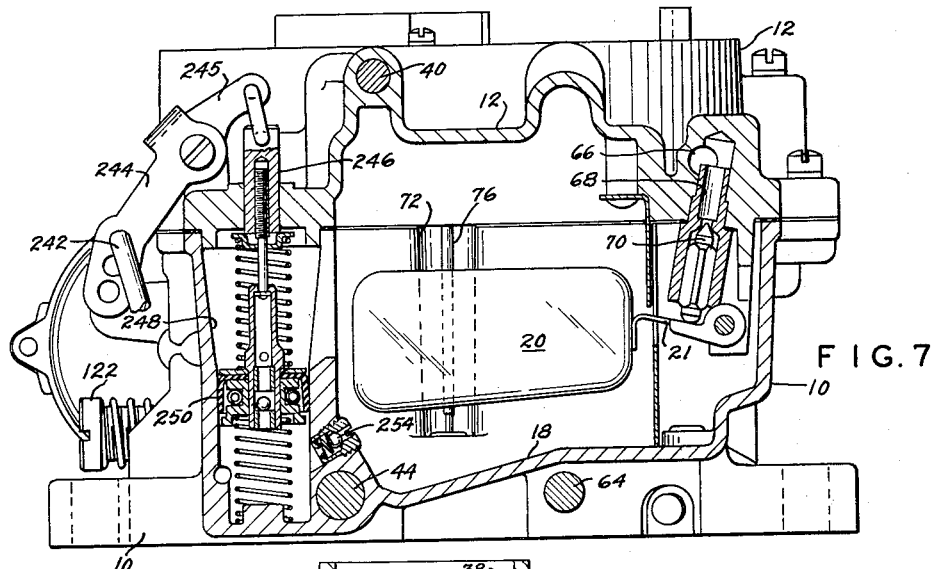
FIG. 7 is a vertical section taken on line 7—7 of FIG. 2.

Referring to the drawings, there is indicated schematically at A in FIG. 1 an automotive vehicle having an engine E on which is a carburetor C. Fuel is supplied to the carburetor C from the fuel tank T of the vehicle. As shown, there is an electric pump EP in the fuel tank for pumping fuel from the tank through a line L1 to a mechanical fuel pump MP on the engine. Pump MP is operated by the engine and is adapted to pump fuel to the carburetor through a line L2.

To illustrate the invention, carburetor C is of the type having two primary mixture conduits or barrels and two secondary mixture conduits or barrels, referred to as a four-barrel carburetor. Carburetor C is mounted on the intake manifold M of the engine with the two primary barrels toward the front of the engine and the two secondary barrels toward the rear. An air filter F is mounted on an air horn portion 13 of the carburetor C (FIGURE 3).

The carburetor C comprises, as shown in FIGURES 2, 3, and 4, of a main body casting 10 with a float bowl cover casting 12 mounted on the top surface of casting 10. The two castings 10 and 12 are fastened together with machine screws 14, for example, and are sealed at their matching edges by the use of a gasket 16 extending between the adjacent surfaces of the castings 10 and 12. The main body casting 10 carries two float bowls 18, in which are positioned floats 20, as shown in FIG. 4.

Within the main casting 10 are formed fuel and air mixture conduits or barrels. Two primary barrels are indicated by P and two secondary barrels are indicated by S in FIGURES 2–4. These mixture conduits or barrels are substantially cylindrical passageways through the castings. The two primary conduits P are positioned at the front of the carburetor and, in the main body casting 10, are separated by a partition 22 (FIG. 4) from the secondary mixture conduits S. In similar manner, a matching partition 24 (FIG. 2) in the air horn portion 13 of the float bowl cover casting 12 is used to separate the primary conduits P from the secondary conduits S.

The two primary conduits B are formed with an inner surface forming a venturi 26 (FIG. 3) and are each separated, one from the other, by the casting portion 28. Extending into the venturi portion 26 of the two primary conduits P are booster venturi structures 30. Vent pipes 32 extend from the float bowl cover casting 12 over each of the primary conduits P. Each vent pipe 32 leads into the top of a different one of the float bowl chambers 18 through conduits 34, one of which is shown in (FIG. 3).

Figure 5:
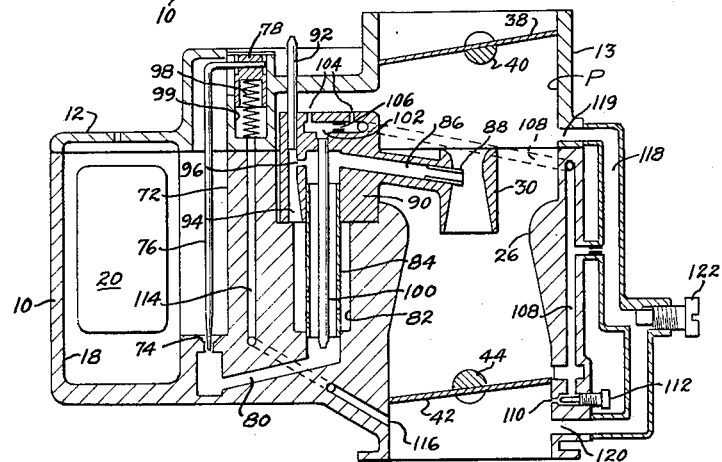
FIGS. 5 and 6 are schematic, elevational views of the carburetor of FIGURES 2–4, showing various circuits.

As shown also in FIGURE 2 and in FIGURE 5, an air valve 38 is mounted on a shaft 40 journaled in the float bowl cover casting 12. The air valve 38 is one, which, when closed, extends from the separating partition 24 (FIG. 2) to the opposite wall of the air horn 13, so as to completely close the air passage through air horn 13 from air filter F to the two primary conduits P. Thus, the shape of the air valve 38 is substantially that shown in FIG. 2 and represented by the space between the partition 24 and the sidewalls and opposite wall of the air passages extending over the primary conduits P. As shown clearly in FIGURE 3, there are a pair of primary throttle valves 42 mounted one in each of the primary conduits P below the venturi section 26. The throttle valves 42 are mounted on and for rotation with a common shaft 44 journaled in the main body casting 10.

Figure 6:
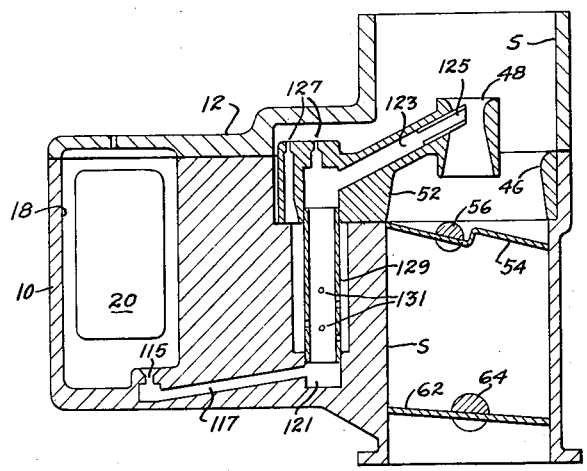

As shown in FIGURES 2 and 4 and as schematically represented in FIGURE 6, the secondary conduits are substantially cylindrical passageways, with each having a restricted portion or venturi 46, in the narrowest part of which is mounted a small venturi 48 forming with the venturi 46, a venturi cluster. Above each of the secondary conduit passages S, there extends a fuel bowl vent pipe 50, leading back into the float bowl cover casting 12 and connecting with the top of the fuel bowl 18.

The secondary venturi structures 46 and 48 are positioned within the main body casting 10. These structures may be formed in any appropriate manner, but as indicated in FIGURE 6 they are formed as a single casting or block 52, which is fixed to the main casting 10. Positioned just below the venturi block 52, in each of the secondary conduits S, is a velocity air valve 54, as schematically shown in FIGURE 6. Each air valve 54 extends across its respective secondary mixture conduit S. The two velocity air valves 54 are connected for rotation herewith to a common shaft 56 journaled within the main body casting 10, as indicated in FIGURE 4. At both ends of the shaft 56, there are fixed weights 58 for biasing the velocity valves 54 in a closed direction against the flow of air therethrough. The weights 58 are enclosed in a weight chamber 60 formed within the casting 10. Chambers 60 are of sufficient size to permit the weights freedom in their movement up and down under the force of gravity and the flow of air through the secondary conduits S. Also mounted within each secondary conduit passage, as indicated schematically in FIGURE 6, is a secondary throttle valve 62. Each of the throttle valves 62 are mounted for rotation therewith to a common shaft 64 journaled in the main body casting 10.

Fuel from the fuel pump MP is brought by fuel line L2 (FIGURE 2) to the carburetor C. Fuel line L2 is connected at the carburetor to a fuel passage 66 formed in the float bowl cover casting 12 and which extends through the casting to each of the fuel bowl chambers 18. As indicated in FIG. 7 for one fuel bowl 18, fuel from the passage 66 enters the fuel bowl 18 through a valve controlled passageway 68 past a control valve 70, which is actuated by the position of the float 20 through a hinged valve operating lever 21 operatively pressing an opposite end of valve 70. When the level of the fuel in chamber 18 is at the predetermined height, the position of float 20 operates valve 70 to cut off the passageway 68 and stop the flow of fuel.

The fuel from each fuel bowl 18 passed into a well, 72, formed by an offset portion of the respective fuel chamber 18. As shown specifically in FIGURES 3 and 5 and with respect to one of the fuel bowls 18, there is positioned at the bottom of each well 72 a fuel metering jet or restriction 74. The flow of fuel through the restriction 74 is controlled by a fuel metering rod 76 which, at its upper end is connected to an air piston 78 for operation thereby. Fuel flowing through each fuel metering jet 74 enters a respective passage 80, and flows through passage 80 to a second well structure 82 formed in the main body casting 10. A perforated metal tubing 84 extends from the bottom of each well 82 to one end of a passage 86 extending to a nozzle 88, whose end projects into the boost venturi 30.

This fuel circuit from each fuel bowl 18 to a respective jet nozzle 88 constitutes the high speed fuel circuit. When the engine is operating at normal speeds, air flowing through the air conduit 13 passes through the venturies 26 and 30. The lower than atmospheric pressure of the fast flowing air through the boost venturi 30 forms a suction at each nozzle 88 to pull fuel from the respective fuel bowl 18 through the high speed fuel circuit. Air passing through the vent pipes 32 and passages 34 into each fuel bowl 18 supplies the atmospheric pressure to the surface of the fuel in each fuel bowl.

As indicated in FIG. 5, each boost venturi 30 and the respective nozzle 88 together with the several passageways shown, may be formed in a single block casting structure 90, which may be fixed in any appropriate manner to the main body casting 10. At the top of the nozzle blocks 90, there are formed apertures, into which an air bleed tube 92 is fixed. Each bleed tube 92 is a simple hollow tube having a restricted upper end for bleeding air into the well 82 through passages 94 in the respective nozzle block 90. Also a passage 96 connects the bleed tube passageways to the upper end of passage 86 to bleed air into the fuel and air mixture leading the nozzle 88 through the passage 86.

During normal operation of the engine, when a relatively large supply of fuel is required for operation, the metering rods 76 are raised out of their respective metering jets 74 to permit a sufficient flow of fuel to each nozzle 88. This operation is provided through the action of springs 94 pressing against the respective pistons 78. However, during low speeds of the engine, particularly during idling, there is not the need of a large fuel flow through the fuel circuits into the nozzles 88. Under these conditions the main primary throttles 42 are closed and a relatively high vacuum is formed down stream of each valve 42. To limit the fuel to a required amount for this condition of engine operation, the metering rods 76 are lowered into the metering jets 74. This is accomplished by the action of manifold vacuum on the pistons 78. Each piston cylinder 99 is connected by passages 114 to an aperture 116 downstream of the main throttle 42 for providing vacuum pressure to draw the respective piston 78 downwardly and move the metering rods 76 into closing position within the respective metering jets 74.

The throttle valves 42 are closed during idling of the engine and cuts off the flow of air through the primary conduits P. To maintain a sufficient air-fuel mixture to retain the operation of the engine, provisions are made to by-pass a fuel-air mixture around the primary throttles 42. An idle fuel tube 100, extends vertically through the center of each well 82. Tubes 100 are open only at their upper and lower ends to form passages between the bottom of each well 82 to an upper passage 102 in each respective nozzle block 90. Leading into each passage 102 from the upper surface of the idle block 90, are a pair of air-bleeding apertures 104, between which is a restriction 106 for metering the air flow through the passage 102. Passage 102 is connected by passages indicated as 108, to form an idle by-pass terminating in an opening 110 positioned in the wall of each primary conduit P below the respective primary throttle 42. The amount of air fuel mixture passing through each outlet 110 is controlled by a respective adjusting screw 112. With the throttles 42 closed, the manifold pressure is low compared to atmospheric pressure so that fuel is urged up each idle fuel tube 100 and through passages 102 and 108. Air is mixed with this fuel from the bleed passages 104. This mixture of air and fuel then passes into the intake manifold from the apertures 110. Additional air for idling operation is provided by an air by-pass passage 118 which extends respectively from an aperture 119 between each air valve 38 and throttle valve 42 to an aperture 120 posterior to the throttle 42. An idle air adjusting screw 122 is used to adjust the amount of air to provide the required idling speed.

The purpose of the secondary fuel mixture conduits SS is to supply to the engine an additional amount of air-fuel mixture during quick acceleration as well as at high speeds. For this purpose, a secondary fuel circuit is provided as schematically indicated in FIG. 6. Fuel from each fuel bowl 18 flows through a metering jet 115 into a fuel passage 117 through the main body casting 10. Fuel passage 117 extends to the lower portion of a fuel well 121 extending upwardly through the main body block 10 and closed at its upper end by the venturi block 52. A fuel-air mixture passage 123 extends from the upper end of the well 121 to a nozzle 125 extending into the venturi structure 48. Air bleed passages 127 extend from the secondary conduit S through the top of the venturi block 52 into the top of the fuel well 121. Extending longitudinally through the well 121 is an apertured tube 129, which is spaced from the sidewalls of the fuel well 121. One of the air passages 127 leads into the space between the tube 129 and the sidewall of the fuel well 12, as shown in FIG. 6.

The operation of each secondary mixture conduits is such that, when the secondary throttles 162 are opened by rotation of their common shaft 64, air will be pumped through the secondary passages S and through the venturi sections 46 and 48. A low pressure area is set up adjacent to each nozzle 125 within the respective venturi structure 48. The differential in atmospheric pressure at the surface of the fuel, in each fuel bowl 18 and that in contact with the level of the fuel in each fuel well 121, will cause the fuel to be sucked either in its vapor form or in an atomized condition through the passage 123 and out of the fuel nozzles 125. Air at substantially atmospheric pressure will bleed through the openings 127 into the passage 123 and into the well structure 121 to further mix with the fuel and its vapors, as they pass into the nozzles of the venturi structures 48. Air passing between the tube 129 and the wall of the fuel well 121 will pass through the small apertures 131 in the sidewall of the fuel tube 129 to further mix with the fuel in the fuel tube 129. The weight biased velocity valves 54 in each of the secondary fuel conduit passages S tend to somewhat restrict the flow of air through the secondary passages S.

Fixed for rotation therewith on the left end of the primary throttle, shaft 44 as viewed in FIGURE 4, are inner and outer primary throttle arms 126 and 128, respectively. The outer primary throttle arm 128 (FIGURE 9) carries a fast idle adjusting screw 130 engageable with a fast idle cam 132 freely pivoted on a stud 134 on the left side of the carburetor C, as viewed in FIGS. 2 and 4. The fast idle cam 132 is overbalanced by an extension 136, so as to be gravity-biased in a clockwise direction, as viewed in FIG. 9, from its fast idle position (cold engine) shown in FIG. 9 to a normal, warm engine idle position. The cam 132 has a starting stop 138 opposed to and engageable by the screw 130, when the cam is in fast idle position for blocking the primary throttle valves 42 open a small predetermined amount and thus provide sufficient air flow for fast idle operation. Intermediate stops 140 successively oppose and engage the screw 130 upon rotation of the cam 132 and block the primary throttle valves 44 open by lesser amounts. A normal idle stop 142 is opposed to the screw 130 when cam 132 has fully moved counterclockwise, permitting the primary throttle valves 44 to assume their normal warm engine idle position.

The fast idle cam 132 is connected by a linkage 144 to a lever arm 146 pivotally mounted for free rotation on choke valve shaft 40 (FIGS. 2 and 9). Fixed on the choke valve shaft 40 for rotation therewith is a lever 148 having an inwardly extending tang 152. Freely pivoted lever 146 has a lug portion 150 extending into the path of rotation of the tang 152.

The choke valve 38 is adapted to swing between its closed position, as illustrated in phantom in FIG. 9, to an open position, in which the valve is substantially vertical as shown and indicated in FIG. 2. Valve 38 is mounted off-center on the choke shaft 40, such that it is unbalanced and tends to swing open in response to the pressure of air flowing down through the carburetor air horn 13. The choke valve has for its function to close off the flow of air through the primary mixture conduits P during the starting of the engine, as well as to modify the flow of air during other conditions of operation of the engine. For example, the opening of the choke valve 38 is limited when the engine is cold and, during cold weather, by a thermostatic control so as to provide automatic enrichment of the air-fuel mixture during the starting of the engine and its operation prior to engine warmup.

Figure 10:
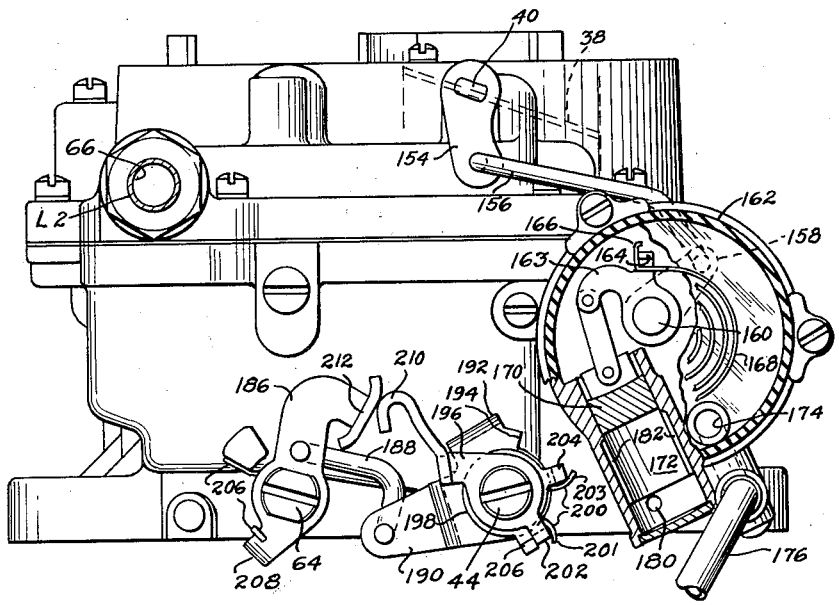

The automatic choking device is shown in some detail in FIG. 10, in which, at the end of the choke valve shaft 40 there is fixed for rotation therewith a short lever arm 154 which is connected at its outer end by a linkage 156 to a short lever arm 158 fixed to a shaft 160 mounted in a portion of a thermostat housing 162. At the other end of shaft 160 is mounted within housing 162 a second lever arm 163 having a laterally projecting lug 164 for contacting the hooked end 166 of a bi-metallic spring element 168, the other end of which may be fixed so that the end 166 of the thermostat spring will move in accordance with the ambient temperature within the housing 162. An outer extension of arm 163 is linked to a piston 170, which is slidedly positioned within a cylinder 172. The space within the thermostat housing 162 is connected by an opening 174 through a passageway to a tubular conduit 176, extending as shown in FIG. 1 to a heat pocket on the exhaust manifold 178.

The lower end of the cylinder 172 is connected through a passageway 180 to an opening into one of the primary mixture conduits P below the primary throttle valve, such as opening 120, for example (FIG. 5). Cylinder 172 has a by-pass portion consisting of slots 182 formed in the sidewalls of the cylinder to permit the passage of air around piston 170 when the piston is positioned within this portion of the cylinder.

The thermostatic coil 168 acts mechanically as a spring tending to hold the choke valve 38 closed by rotation of shaft 40 and arm 154 in a counter-clockwise direction, as viewed in FIG. 10. The turning over of the engine creates a low pressure or partial vacuum in the manifold, which is evidenced through opening 180 in the cylinder 172. This pulls the piston 170 downwardly to tension thermostatic spring 168 and to rotate shaft 160 and its arm 158. This action through linkage 156 and arm 154 tends to rotate the choke valve 38 clock-wise (as viewed in FIGURE 10) to permit air to enter the primary mixture conduits for engine starting. When the engine starts, piston 170 will be positioned within cylinder 172 adjacent to the by-pass slots 182. Thus, the low pressure suction through opening 180 in the cylinder will permit air under atmospheric pressure to flow through the heat pocket on the exhaust manifold 178 and through the conduit 176 into the thermostat housing 162. As the engine heats up, the heated air flowing through housing 162 will cause the thermostat spring 168 to unwind and relax its choke valve closing pressure on the lug 164. As the temperature of the air flowing through housing 162 increases, the thermostat spring 168 unwinds to a greater extent to move entirely out of contact with the laterally extending lug 164, and at normal operating temperatures of the engine, the thermostatic spring 168 has no effect on the opening and closing of the choke valve 38.

Figure 12:
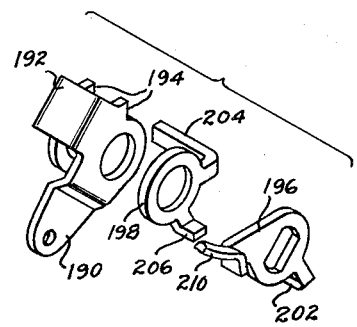
FIG. 12 is an exploded view of the elements mounted on the throttle shaft of FIGURE 10.

In operation, it is desirable that the secondary throttles 62 be only open during the latter portion of the opening of the primary throttles 42. For example, in the type of carburetor described, means are provided for opening the secondary throttles after the primary throttles have opened 50° from their fully closed position. For this purpose, as shown in FIG. 10, at one end of the secondary throttle shaft 64 there is fixed a lever arm 186 for rotation with shaft 64. Arm 186 is joined by a link 188 to an inner lever 190 loosely mounted for rotation on the primary throttle shaft 44. Arm 190 has a laterally extending U-shaped portion 192 having leg portions 194 (FIG. 12) journaled on the shaft 44. Fixed to the adjacent end of the primary throttle shaft 44 and for rotation therewith is an outer lever 196. Spaced between the outer lever 196 and the freely pivotable inner lever 190 is a freely rotatable intermediate driving dog 198. Positioned on the throttle shaft 44 is a coil spring 200 (FIG. 2) extending between the leg portions 194 of the inner lever 190. One end 201 of the coil spring 200 presses against and is held by a laterally extending lug portion 202 of the outer lever 196. The other end of the coil spring 200 presses against and is held by a laterally extending lug portion 204 of the dog 198. A second laterally extending lug portion 206 of dog 198 contacts the laterally extending lug 202 of outer lever arm 196 to prevent relative movement between the levers 196 and 198 when the outer lever 192 is rotated clockwise by throttle shaft 44 in a clockwise direction, as viewed in FIGURE 10.

As the primary throttle shaft is opened, the shaft 44 as viewed in FIG. 10 will rotate counter-clockwise. During this movement the outer lever 196 is carried with shaft 44 and in turn drives the dog 198 through the resilient connection of the spring 200. These parts can rotate in this counterclockwise direction (as viewed in FIGURE 10), until the laterally extending lug 204 of the dog 198 contacts the leg portions 194 of the inner lever 190. Further rotation of shaft 44 will then drive lever arm 190 in a counterclockwise direction through the elements 196 and 198. Rotation of inner lever 190 in this counter-clockwise direction will pull the lever arm 186 and the secondary throttle shaft 64 fixed thereto, in a clockwise direction to open the secondary throttles 62. During the initial opening of the primary throttle valves, and during the rotation of shaft 44, the secondary throttle valves are retained closed by spring 206 (FIGURES 2 and 10) tensioned between an extension 208 of the lever arm 186 and a fixed portion of the main body casting 10.

The scondary throttle linkage is so proportioned that the secondary throttle valves arrive at their wide open position at the same time as the primary throttle valves. A shoe 210 on the outer lever 196 is engageable with a second shoe 212 on lever arm 186 of the secondary throttle shaft 64 to preclude opening of the secondary throttle valves until the primary throttle valves have been opened their predetermined amount.

In accordance with this invention, means are provided to prevent the secondary throttle valves from opening until the underhood temperature reaches a certain amount. As shown in FIGS. 9 and 11, a dog 214 is fixed to the end of the secondary throttle shaft 64 for rotation therewith. The dog 214 has a projecting lug 216 for fitting into a matching slot 218 in a lockout lever 220. The lockout lever 220 is freely pivoted for rotation on the stud 134 and independently of the fast idle cam lever 132. Lockout lever 220 includes an extension portion 222, which is in contact with one end 223 of a lockout latch consisting of a bi-metal leaf 224, having the other end thereof fixed to an outstanding lug 226 projecting from the main body casting 10. The free end 223 of the bi-metal strip 224 prevents rotation of the lockout lever 220 in a clockwise direction under the weight of the laterally extending portion 228 of lever 220.

If for any reason the lockout lever 220 fails to unlock the secondary throttle shaft 64, when the choke valve 38 is opened and the throttle valves 42 are opened so that the idle screw 130 is out of contact with the fast idle cam 132, the fast idle cam 132 will rotate clockwise under the effect of gravity on its weighted end 136 and a lug 230 on cam 132 will strike the edge 232 of the lockout lever 220 to move lever 220 to unlocking position (FIGS. 9 and 11).

On the stopping of the engine for any reason, the primary throttle shaft 44 is normally released so that the end of the hot idle cam screw 130 will extend into the path of counter-lockwise rotation of portion 142 of the hot idle cam 132. This will retain the hot idle cam 132 with its weighted portion 136 in its lowered position. Lug 150 on lever arm 146 will contact lug 152 of lever 148 on the choke valve shaft 40 to retain the choke valve 38 in substantially a vertical open position. Upon the cooling of the motor, the thermostat spring 168 will relax and contact lug 164 of lever 162 to pull the lever 162 and its shaft 160 in a clockwise direction, as viewed in FIG. 10, to urge the choke valve shaft 40 in a direction to close the choke valve against the contacting lugs 150 and 152.

Also as the under-hood temperature drops, the thermostat latch or locking spring 224 will move downwardly and contact the top of lever portion 222 of the lockout lever 220, which is in its clockwise position (as viewed in FIGURE 9). Upon starting the car, manual movement of the primary throttle shaft 44 in a clockwise direction as viewed in FIG. 9, will cause the end of screw 130 to release the hot idle cam portion 142 and allow the hot idle cam 132 to rotate counter-clockwise, as viewed in FIG. 9, under the urging of the thermostatic spring 168 through the several connecting levers and linkages. As the hot idle cam is rotated counter-clockwise in this described direction, lug 230 of the cam will strike a projecting lug portion 234 on the secondary throttle lockout lever 132 to rotate the lever 220 in a counter-clockwise direction and cause the lever portion 222 to slide out from under the thermostatic leaf 224, which it has been supporting. As the lever portion 222 rides out from under the leaf 224, the leaf 224 will snap down and lock the lever portion 222 in substantially vertical position.

The described structure above is one, then, which will prevent the secondary throttles from operation until the temperature both of the motor and that under the hood of the car has attained a sufficiently high value such that opening of the secondary throttles is warranted. Since the temperature of the motor will attain a high temperature prior to the underhood temperature, the thermostatic spring 168 will operate first to release the choke valve for free operation, but the secondary throttles are not released until the under-hood temperature is sufficient to cause the thermostatic spring to 224 to raise and unlock the secondary throttle shaft. Thus, the secondary throttles are retained in locked position even in spite of the fact that the primary throttle shaft 140 is rotated to a degree to open the primary throttles to a full position. This is possible since the intermediate driving dog 198 is spring driven from the lever 196. When the secondary throttle shaft 64 is locked by the secondary throttle lockout lever 220, the two levers 186 and 190 together with their linkage 188 are also locked in an immobile position. Thus, when the intermediate driving dog position 204 strikes the leg portions 194 of inner lever 190, the intermediate dog 198 will stop but the outer lever 196 fixed to the end of primary throttle shaft 44 will continue to rotate under urging by manual operation because the linkage between lever 196 and the intermediate dog 198 is by the spring 202 only.

Figure 8:
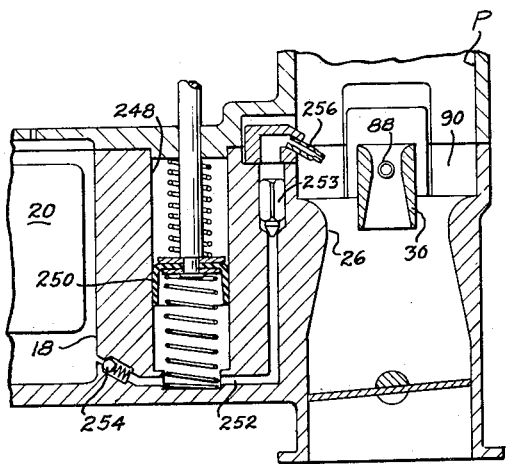
FIG. 8 is a schematic elevational sectional view of the carburetor of FIGURES 2–4 showing the acceleration pump circuit.

For quick acceleration, a lever arm 240 fixed to the primary throttle shaft 44 for rotation therewith is connected by a linkage 242 to a pump operating lever 244 having the other end 245 linked to a pump piston 246. The pump is located in a well 248 (FIGURE 7) positioned at one end of one fuel bowl 18. FIGURE 8 schematically shows the pump chamber 248 and the pump circuit leading to the primary mixture conduit P. At the end of the pump piston rod 246 is a flexible pump piston 250 for pressurizing fuel in a conduit 252 extending from the fuel bowl 18 through a ball valve structure 254 through the bottom of pump chamber 248 and to an accelerating jet nozzle 256 extending into the space between the booster venturi block 90 and the sidewall of the primary mixture conduit passage P. During normal operation if any acceleration of the motor is desired, an opening of the throttle manually will rotate throttle shaft 44 and cause the piston 200 to force fuel through the weighted valve 253 upwardly and to inject fuel through the accelerator nozzles 256 into the venturi throat.

As described above, if the underhood temperature is below a predetermined value, thermostatic leaf 224 will occupy the position shown in solid lines in FIG. 9, in which it prevents the lever 220 from swinging clockwise out of secondary locking position. Then, even though the choke valve 38 fully opens, the fast idle cam 132 is ineffective to swing the lockout lever 220 to unlatching position. Also, in accordance with the invention fast idle cam 132 under these circumstances backs off (swings clockwise) from its FIG. 9 fast idle position only to the point where the lug 230 on the cam 132 engages edge portion 232 of lever 220, cam 132 then stops in a position short of its normal idle position. Even though the backing off of the fast idle cam 132 is arrested short of normal idle position, the choke valve 38 can complete its movement to full open position by reason of the lost-motion provided between lugs 150 and 152 in the interconnection between the choke valve 38 and the fast idle cam 132. The fast idle cam 132 remains in the arrested position, which is an intermediate position wherein it is adapted to hold the primary throttle valves 149 blocked open to some extent at idle, thereby tending to provide the correct idle speed, until the underhood temperature is increased by heat from the engine sufficiently to cause leaf 224 to bend upward off arm 222. Then, the fast idle cam 132 completes its movement to normal idle position and releases the lever 301 from lug 303.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:
1. A carburetor for an internal combustion engine, said carburetor comprising a mixture conduit, a throttle valve movably mounted in said mixture conduit for movement from a closed position closing said mixture conduit to an open position opening said mixture conduit, a lockout means holding said throttle valve in said closed position, means for releasing said lockout means to permit opening movement of said throttle valve, and a releasable latch positioned in contact with said lockout means and latching said lockout means to prevent release of said lockout means by said releasing means.

2. A multi-stage carburetor for an internal combustion engine, said carburetor comprising a primary mixture conduit and a secondary mixture conduit, a first throttle valve means rotatably mounted in said primary mixture conduit, and a second throttle valve means movably mounted in said secondary mixture conduit for movement from a closed position closing said secondary mixture conduit to an open position opening said secondary mixture conduit, a lockout means holding said second throttle valve means in said closed position, means for releasing said lockout means to permit opening movement of said second throttle valve means, and a releasable latch positioned in contact with said lockout means and latching said lockout means to prevent release of said lockout means by said releasing means, said releasing means including a stop member mounted in the path of rotation of said first throttle valve means to hold said first throttle valve means in a position for fast idling of said engine, said lockout means in said latching position including an element thereof blocking movement of said stop member at a position holding said first throttle valve means in said position for fast idling.

3. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout holding said throttle valve in said closed position, a movable element biased into contact with said lockout for releasing said lockout and to permit opening of said throttle valve, means retaining said releasing element in an inoperative position and including structure responsive to air flow through said primary mixture conduit for releasing said biased element to lockout contacting position, and a releasable latch positioned in contact with and latching said lockout to prevent release of said lockout by said movable element.

4. A carburetor for an internal combustion engine, said carburetor comprising a mixture conduit, a throttle valve movably mounted in said mixture conduit for movement from a closed position closing said mixture conduit to an open position opening said mixture conduit, a lockout holding said throttle valve in said closed position, a movable element biased into contact with said lockout for releasing said lockout and to permit opening of said throttle valve, means retaining said releasing element in an inoperative position and including a thermostatic means responsive to engine temperature for releasing said biased element to lockout contacting position, and a releasable latch positioned in contact with lockout and latching said lockout to prevent release of said lockout by said movable element.

5. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a gravity biased release element having a portion thereof for contacting and releasing said lockout lever upon movement of said release element by gravity, and a temperature responsive latch positioned in contact with said lockout lever and latching said lockout lever to prevent release of said lockout lever by said release element.

6. A multi-stage carburetor for an internal combustion engine, said carburetor comprising a primary mixture conduit and a secondary mixture conduit, a first throttle valve means rotatably mounted in said primary mixture conduit, a second throttle valve means movably mounted in said secondary mixture conduit for movement from a closed position closing said secondary mixture conduit to an open position opening said secondary mixture conduit, a lockout lever pivotally mounted on said carburetor and holding said second throttle valve means in said closed position, a lockout lever release means for releasing said lockout lever to permit opening movement of said second throttle valve means, said release means including a gravity biased release element having a portion thereof for contacting and releasing said lockout lever upon movement of said release element by gravity, and a temperature responsive latch positioned in contact with said lockout lever and latching said lockout lever to prevent release of said lockout lever by said release element, said release element including a variable stop member positioned in the path of rotation of said first throttle valve means to hold said first throttle valve means in a position for fast idling of said engine, said lockout lever when latched being positioned to block releasing movement of said release element in a position wherein said variable stop member holds said first throttle valve means in said position for fast idling.

7. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a movably supported gravity biased release element having a portion thereof for contacting and releasing said lockout lever upon movement of said release element by gravity, movable means including a releasable biasing spring joined to said release element for moving said release element against gravity away from said lockout lever, and a temperature responsive latch positioned in contact with said lockout lever and latching said lockout lever to prevent release of said lockout lever by said release element.

8. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a movably supported gravity biased release element having a portion thereof for contacting and releasing said lockout lever upon movement of said release element by gravity to an operative position, movable means including a biasing spring responsive to engine temperature and joined to said release element for moving said release element against gravity away from said operative position, an air valve responsive to air flow through said primary mixture conduit and connected to said movable means to move said movable means against said biasing spring, and an ambient temperature responsive latch positioned in contact with said lockout lever and latching said lockout lever to prevent release of said lockout lever by said release element.

9. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a gravity biased release lever pivotally mounted on said carburetor with said lockout lever in the path of pivotal movement of said release lever for contacting and releasing said lockout lever, a releasable spring means biasing said release lever against gravity away from releasing position, and a temperature responsive latch means positioned in contact with said lockout lever and latching said lockout lever to prevent release of said lockout lever by said release lever.

10. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a gravity biased release lever pivotally mounted on said carburetor with said lockout lever in the path of pivotal movement of said release lever for contacting and releasing said lockout lever, a spring means biasing said release lever against gravity away from releasing position, and a temperature sensitive latch means positioned in contact with said lockout lever and latching said lockout lever to prevent release of said lockout lever by said release lever, said spring biasing means including an air valve positioned in said primary mixture conduit and responsive to air flow through said primary mixture conduit to oppose said biasing action of said biasing spring.

11. A multi-stage carburetor for an internal combustion engine, said carburetor comprising a primary mixture conduit and a secondary mixture conduit, a throttle valve movably mounted in said secondary mixture conduit for movement from a closed position closing said secondary mixture conduit to an open position opening said secondary mixture conduit, a lockout lever pivotally mounted on said carburetor and holding said throttle valve in said closed position, a lockout lever release means for releasing said lockout lever to permit opening movement of said throttle valve, said release means including a gravity biased release lever pivotally mounted on said carburetor with said lockout lever in the path of pivotal movement of said release lever for contacing and releasing said lockout lever, and a means including a thermostatic spring means responsive to engine temperature for moving said release lever against gravity away from releasing position, and an ambient temperature responsive latch means positioned on the outside of said carburetor in contact with said lockout lever and latching said lockout lever to prevent release of said lockout lever by said release lever.

References Cited in the file of this patent

UNITED STATES PATENTS

| | | |
|---|---|---|
| 2,328,763 | Winkler | Sept. 7, 1943 |
| 2,609,806 | Winkler | Sept. 9, 1952 |
| 2,715,522 | Carlson et al. | Aug. 16, 1955 |
| 2,943,848 | Gordon et al. | July 5, 1960 |